Nov. 10, 1931.  R. E. NEWELL  1,831,077
THERMOSTAT
Original Filed March 8, 1928  4 Sheets-Sheet 2
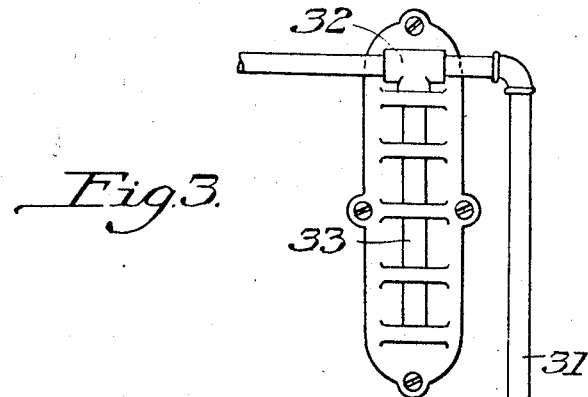
Fig.3.
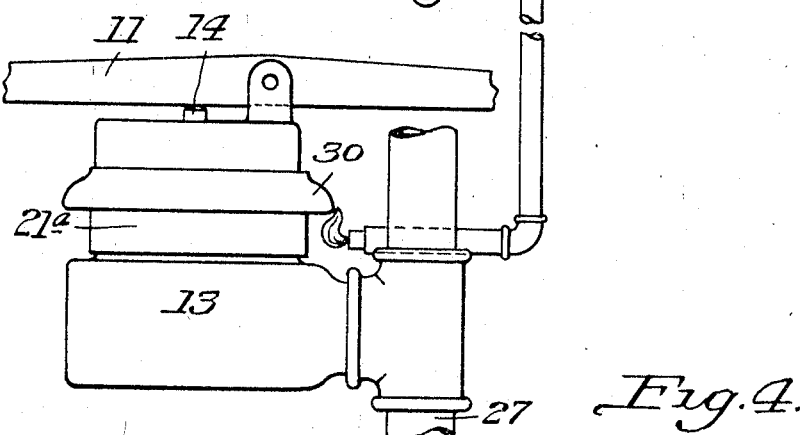
Fig.4.
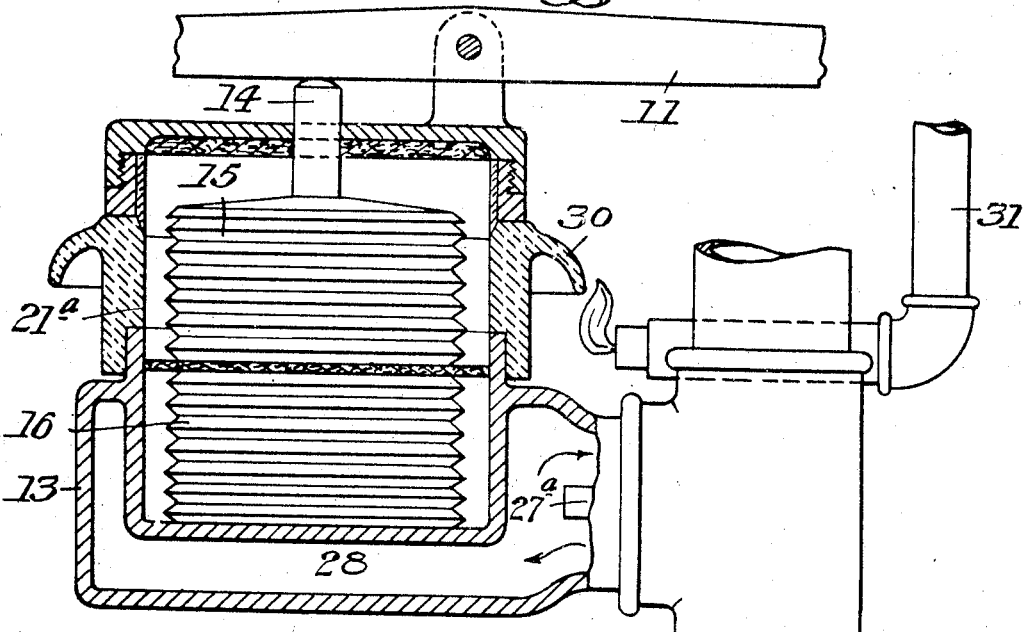
Fig.5.
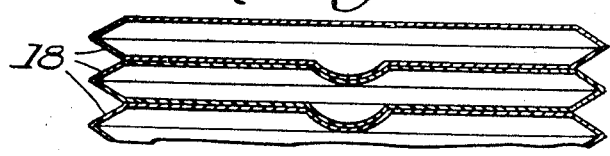
INVENTOR
Robert E. Newell
By Archworth Martin,
Attorney.

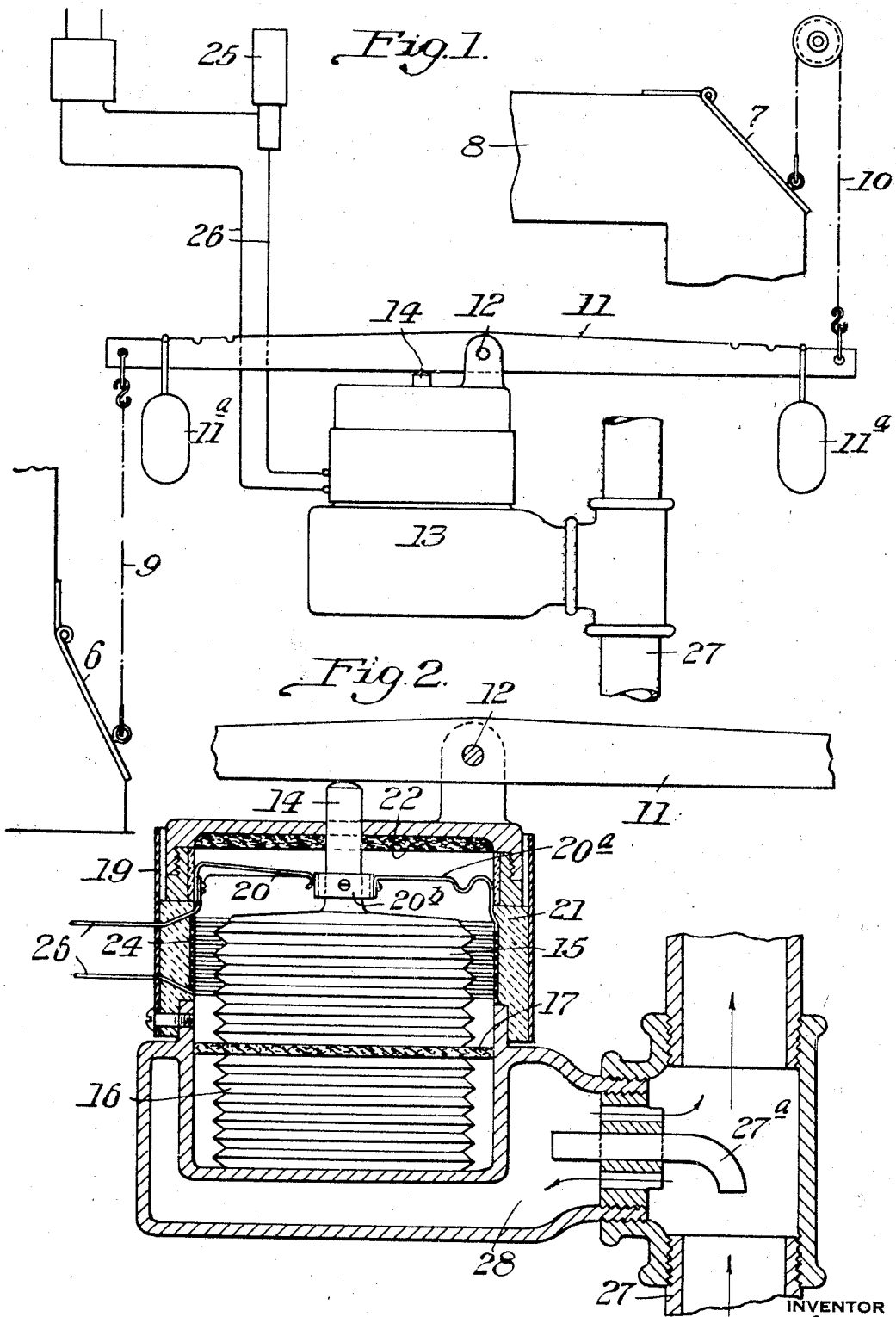

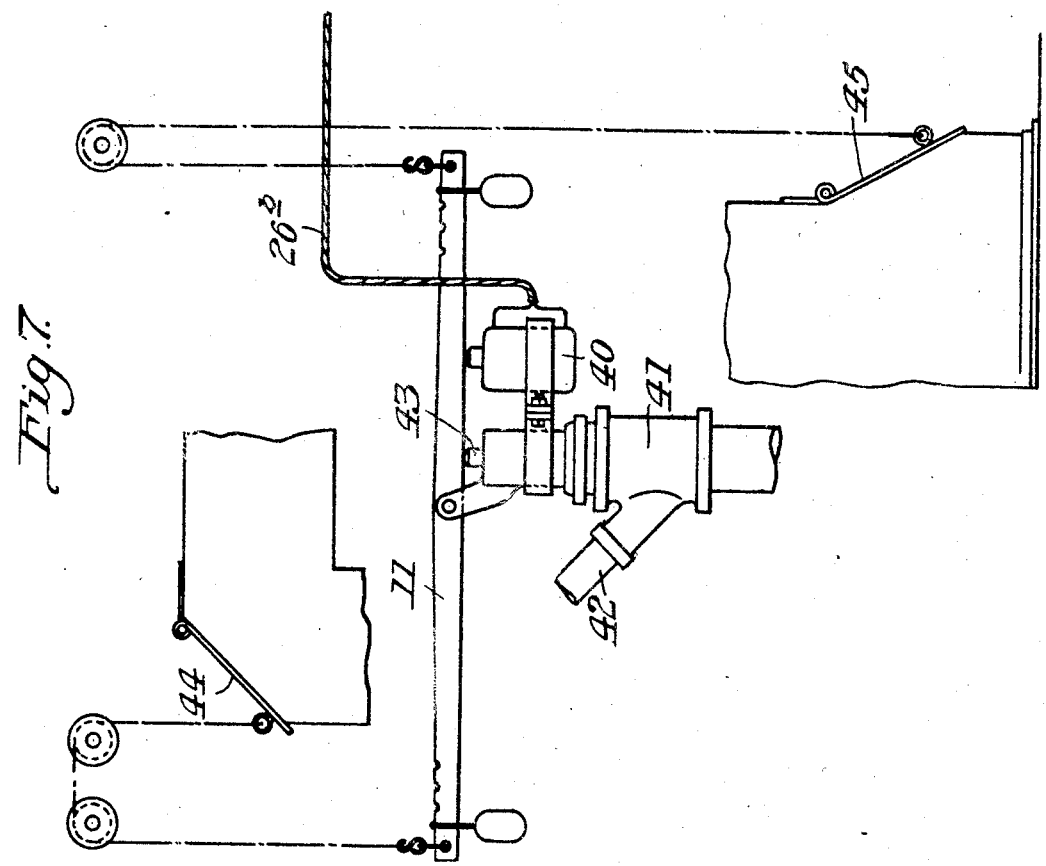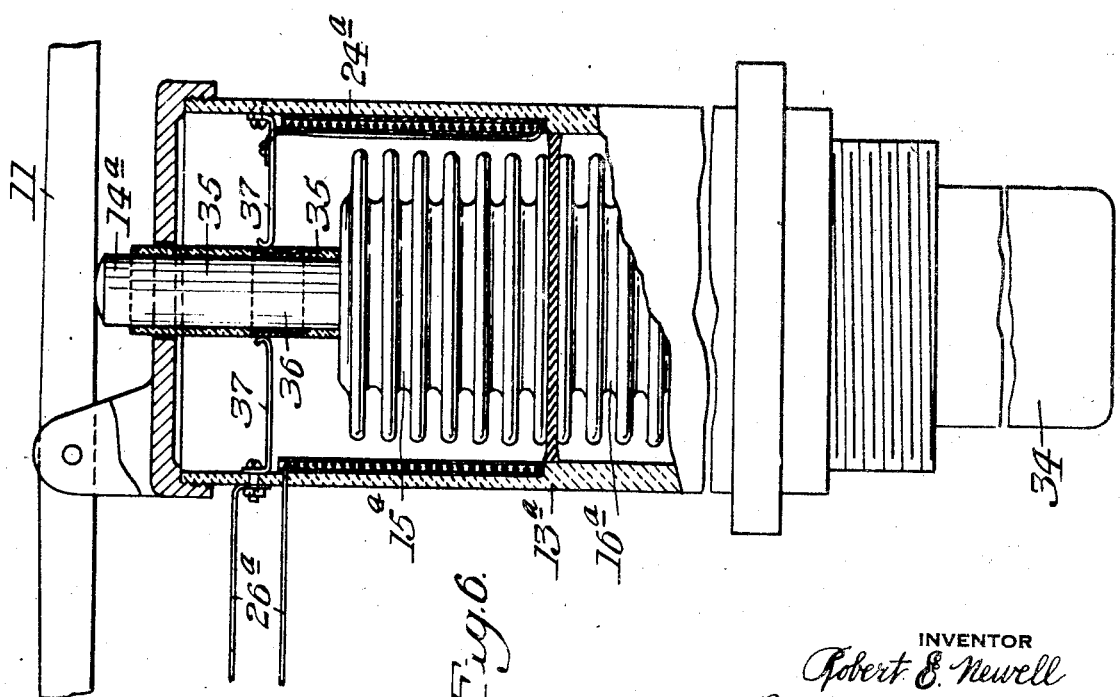

Patented Nov. 10, 1931

1,831,077

UNITED STATES PATENT OFFICE

ROBERT E. NEWELL, OF IRWIN, PENNSYLVANIA

THERMOSTAT

Application filed March 8, 1928, Serial No. 260,203. Renewed February 28, 1930.

My invention relates to thermostats, and more particularly to those especially suitable for controlling the temperatures of furnaces in house-heating systems, although it is susceptible of use in various other relations.

One object of my invention is to provide thermostat apparatus that will be actuated either upon predetermined changes in temperature in a room or upon changes in furnace temperatures, or through the combined changes of such temperatures.

Another object of my invention is to provide means controlled both by room temperatures and furnace temperatures for regulating the furnace drafts.

Still another object of my invention is to provide a device that is quickly responsive to temperature changes.

Figure 8:
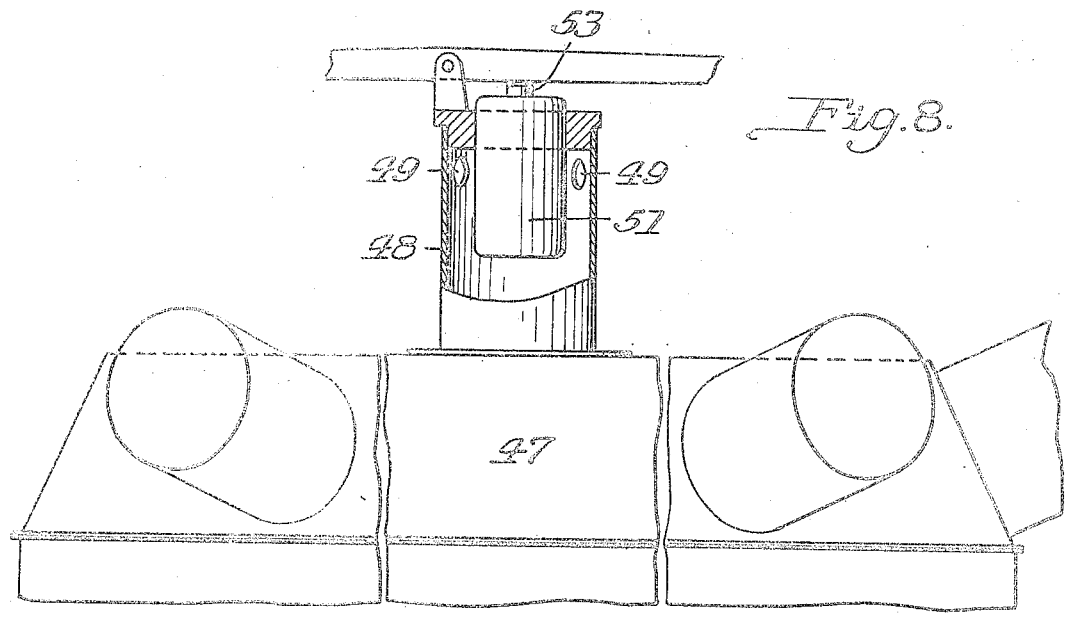
Figure 9:
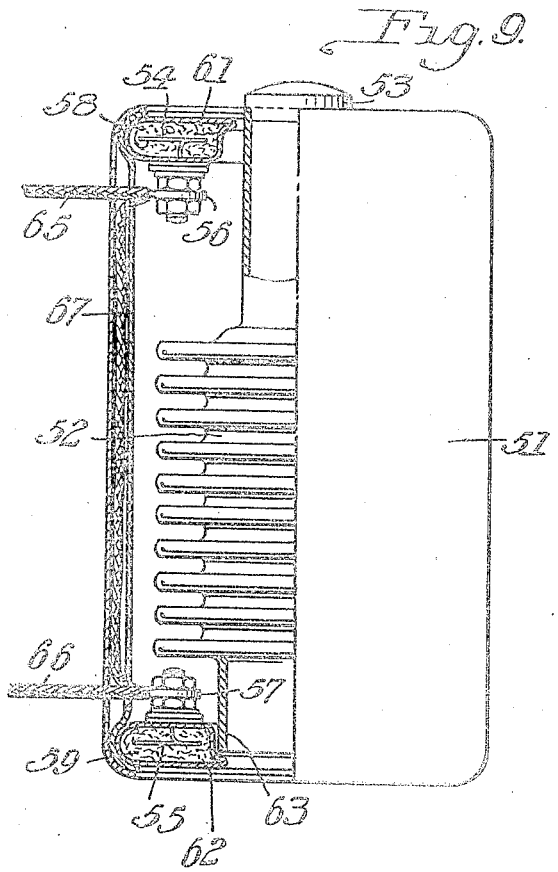
Figure 10:
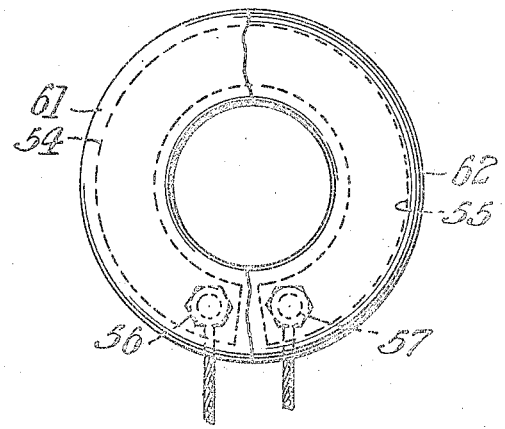

A still further object of my invention is to simplify and improve generally the structure and operation of temperature-controlled devices. Some of the forms which my invention may take are shown in the accompanying drawing, wherein Figure 1 is a somewhat diagrammatic view of a system embodying my invention; Fig. 2 is a sectional view, on an enlarged scale, of a portion of the apparatus of Fig. 1; Fig. 3 is a view showing a modification of a portion of the apparatus of Fig. 1; Fig. 4 is an enlarged sectional view of a portion of the apparatus of Fig. 3; Fig. 5 is a sectional view of certain of the temperature-responsive devices of Figs. 2 to 4; Fig. 6 shows a modification of the device of Fig. 1, partially in section; Fig. 7 shows still another modification; Fig. 8 is a view showing a form of thermostatic apparatus that is especially suitable for controlling hot air furnaces, or as an attachment for controlling hot water and steam regulators already in use; Fig. 9 is a view, partially in elevation and partially in section, on an enlarged scale, of the thermostatic device of Fig. 8, and Fig. 10 is a plan view of one of the heating elements of Fig. 9.

Referring now to Figs. 1 and 2, I show a damper 6 for controlling draft into the fire box of a furnace (not shown) and a damper 7 for controlling draft through a flue pipe 8 that leads from the furnace. These dampers are operated through chains 9 and 10, respectively, each of which is connected to one of the dampers and to an operating lever 11 which is pivotally mounted at 12 upon the removable cover of a thermostat casing 13. A plunger 14 operates through the cover or upper end of the casing, to oscillate the lever 11 about its pivot, so as to open and close the dampers 6 and 7 upon changes in the temperature, as hereinafter explained. Weights 11a are provided for regulating the pressures at which the lever 11 will be oscillated.

The casing 13 is provided with a chamber in which two sets 15 and 16 of thermo-sensitive or heat responsive elements are contained, an insulating disc 17 of asbestos or the like being vertically slidable within the chamber 14 during expansion and contraction of the elements 15 and 16. This disc provides a thermal seal between the groups of elements 15 and 16 so that neither group will be unduly affected by changes in temperature of the other group.

The groups of thermal elements 15 and 16 are each shown as consisting of a series of hollow disc-like members 18 (Fig. 5) of copper or other suitable material, which when assembled have the appearance of and function somewhat after the manner of a bellows or sylphon, but each member can be readily removed for replacement or repair.

The contacting surfaces of the discs 18 have depressions and bosses that co-operate to hold the discs of each group centralized axially. Each of the members 18 is filled with a liquid such as ether that will expand readily upon increase of temperature. The elements 15 and 16 may each be composed of a single bellows-like structure, if desired, instead of a plurality of bellow discs 18.

The upper part of the casing 13 consists of an outer jacket 19 of sheet metal or the like, lined with refractory material 21, the cover plate being provided with a lining 22 of hair felt or the like. This arrangement avoids substantial variation in operation of the elements 15 and 16 through changes in atmospheric conditions in the vicinity of the thermostat.

An electric heating coil 24 is disposed against the inner wall of the casing 13 and in proximity to the group of thermal elements 15, so that when electric current is passed through the coil 24, the elements 15 will be heated and will expand, to operate the lever 11. The circuit through the coils is controlled by a thermal switch 25 that is disposed in a room which is to be heated by the furnace, so that when the room temperature increases to a predetermined degree, the switch 25 will be closed and a circuit completed through a line 26 which may lead from a house-lighting circuit to the coils 24. No transformers, relays or additional resistance are required. One side of the line 26 is connected, through a yieldable contact member 20, a collar 20b, and a contact member 20a, with one end of the coil 24 and the other side of the line is connected to the other end of the coil. The collar 20b is secured to, but insulated from, the plunger 14a and the circuit is broken at extreme upper and lower positions of the plunger, as hereinafter explained in connection with the discussion of Fig. 6.

The elements 15 will be expanded by the heating coil 24, and the dampers 6 and 7 operated to reduce the draft through the furnace. The thermal switch 25 may be of various types well-known in the art and need not therefore be described in detail.

The thermal elements 16 are controlled by furnace temperatures, either directly by the temperature within the fire box or by the temperature of the heating medium flowing from the furnace. In the present case, I show a pipe 27 for conducting hot water from a furnace to radiators of a room to be heated. A conduit 27a has its outer end turned downwardly into the upward path or flow of the heated water and its inner end projecting into a water chamber 28 beneath the thermal elements 16. Thus, if the furnace becomes excessively hot, the elements 16 will be caused to expand and open the dampers 6 and 7, notwithstanding the fact that the thermal switch 25 may be open.

The water at normal temperatures will maintain the thermal element 16 in a partially-expanded condition so that when the room temperature results in closing of the switch 25, the heating coils 24 will more quickly cause the actuation of the damper, because expansion of the element 16 is transmitted to element 15 and less expansion of 15 is therefore required, thus making the thermostat more quickly responsive to changes in room temperature and also economizing in consumption of electricity.

Referring to Figs. 3 and 4, I show an arrangement wherein the thermal elements 16 are controlled by furnace temperatures as in the case of Figs. 1 and 2, but wherein the elements 15 are subjected to the action of a gas flame, the wall 21a of the thermostat being in this case provided with a flange or ledge 30 for entrapping and retaining heat from a gas flame. Gas for the flame is supplied through a pipe 31 that is in turn controlled from a thermal valve 32.

The thermal valve is operated upon by a thermostatic rod 33, these members being located in a room that is being heated. The thermal valve structure may be of various well-known types, such, for example, as the thermally-controlled gas valves of domestic water heaters, but with reverse action, so that upon substantial temperature increases within the room, the valve 32 will be actuated to increase the supply of gas. Sufficient gas is permitted at all times to flow through the pipe 31 to maintain a pilot flame, so that whenever the temperature in the room increases to such an extent as to require operation of the dampers, the gas flame will be projected beneath the ledge 30 to cause expansion of the elements 15.

Referring now to Fig. 6, I show the damper-operating lever 11 controlled by a modified form of thermostat. In this arrangement, the casing 13a is similar to the casing 13, but extends upwardly for a greater distance. Bellows 15a and 16a are provided which function after the manner of bellows 15 and 16 of Fig. 2. In this form of device, also, I provide means for breaking the electric circuit when the plunger 14a is elevated a predetermined distance, to save electric current when the plunger 14a is being held in substantially its uppermost position. A sleeve 35 of insulating material is secured to the plunger 14a and carries a collar 36 of copper or other suitable conducting material. A pair of conductors 37 of yieldable material, such as phosphor bronze, are connected to the conductors 26a which correspond to the conductors 26 of Fig. 1, the heating coil 24a being of course interposed between one of the conductors 37 and one side of the line 26. The collar 36 serves as a bridging member to complete the circuit when a thermostat switch, such as the switch 25, is closed and the plunger 14a in lowered position.

A bulb 34 extends from the lower end of the casing and contains acetone or other expansible liquid. The bulb communicates with the interior of the bellows 16a so that heating of the bulb will result in expansion of such bellows. The bulb is positioned to be acted upon by hot water or other fluid, as in the case of the structure of Figs. 1 and 2.

If the room temperature rises to such point that the circuit is closed through the heating coil 24a, the thermal element 15a will be heated and expand, to raise the plunger 14a, thereby also raising the collar 36. When the plunger has been elevated sufficiently to carry the collar 36 out of engagement with the conductors 37, such conductors will bear against the lower portion of the sleeve 35 and the circuit be thereby interrupted. The plunger 14a will therefore be maintained in elevated position, so long as there is sufficient heat present in the casing 13a, without constant consumption of electric current.

On the other hand, the sleeve 36 may be of such length that when the plunger 14a is in its extreme lower position, the collar 36 will have passed out of engagement with the conductors 37, this action breaking the circuit. This latter feature can be utilized to avoid closure of the electric circuit by the switch 25 in the summertime, when the furnace is cold and out of doors temperatures approach the indoor temperatures of winter. This result is effected by reason of the fact that in summertime the heating system is of course cold and there will be no expansion of the bellows 16a sufficient to raise the plunger 14a until the collar 36 engages the conductors 37.

In Fig. 7, I show a thermostat 40 that is controlled entirely by heating coils supplied with electric current through conductors contained in a cable 26b, these conductors corresponding to the conductors 26 of Fig. 1, and the thermostat 40 being provided with a heating coil corresponding to the coil 24. The thermostat is also provided with a bellows corresponding to the bellows 15 of Fig. 1, but there is no direct co-action between the bellows of the thermostat 40 and a thermostat 41 which is controlled by the water temperatures.

The thermostat 40 is shown as applied to an installation of a well-known type, wherein water from the heating system is supplied through an inlet 42 to the thermostat chamber 41 which contains an expansible element that will raise the plunger 43 to operate the damper lever 11. The lever 11 is therefore controlled by each of two independently operable thermostat elements, so that if the temperature of the heating system passes a predetermined point, the dampers 44 and 45 will be operated, while the dampers will also be operated through the medium of the thermostat 40, upon predetermined changes in room temperatures, or operated by these elements conjointly.

Referring to Figs. 8, 9 and 10, I show a thermostatic device that is especially suitable for use in controlling hot air furnaces, although it may also be used in a manner similar to the devices of Figs. 1 to 7. The jacket of a hot air furnace is represented by the numeral 47 and is provided with a sleeve-like extension 48 into which heated air within the jacket 47 may rise. Openings 49 are provided in the upper end of the sleeve 48 to facilitate flow of heated air into such sleeve, but these openings may be omitted, if desired, since heated air will readily rise into the sleeve.

A thermostat 51 is supported in the upper end of the sleeve 48, so that when the temperature within the jacket 47 reaches a dangerously high point, the thermostat will be operated to control dampers as in the case of Fig. 1, for example. This condition may arise when the furnace becomes rapidly heated and the increase in room temperature lags to such extent that it may be necessary to prevent the furnace from becoming dangerously hot, even before a room being heated has reached a normal temperature.

The thermostat 51 contains a bellows 52 that is provided with a plunger 53 for operating a damper lever. The control of the thermostat 51 by a thermal switch, through changes in room temperature, is effected by means of resistor elements 54 and 55 that may be of various well-known forms but are here shown as of the ribbon-type. Each of these elements is provided with a pair of terminals 56 and 57. The elements are shown as embedded in refractory materials 58 and 59 that serve to exclude air and moisture from the elements and hence preserve them against corrosion and disintegration. The members 58 and 59 are enclosed in metal cases 61 and 62 respectively, the case 62 serving as a seat for a tubular extension 63 of the bellows 52, and such extension containing a body of acetone or the like, which expands into the bellows.

The terminal 56 of the element 54 is connected to a conductor 65 that leads to a switch (not shown) such as the switch 25 of Fig. 1, and the terminal 57 of element 55 leading to the other side of said switch, through a conductor 66. A conductor 67 connects the terminal 57 of the element 54 with the terminal 56 of the element 55, so that current from the line 65 will flow through its terminal 56, the resistor 54, the upper terminal 57, the conductor 67, lower terminal 56, resistor 55, and the lower terminal 57 to the conductor 66.

It will therefore be seen that the thermostat 51 is controlled by either changes in room temperature or changes in furnace temperatures, or by said temperatures jointly.

For steam or vapor heating systems, the double bellows system can be used in much the same way, the principal difference being that in such systems the lower bellows is expanded by direct internal pressure of steam or vapor instead of being expanded by temperature.

Various other modifications may be made in the structure and operation of my invention. For instance, instead of the thermostatic devices controlling the draft through a furnace, they could be utilized to control fuel supplied thereto, particularly where fuel oil or gas is used.

I claim as my invention:—

1. Heat-regulating apparatus comprising a thermo-sensitive element consisting of an expansible and collapsible sheet metal vessel containing a vaporizable substance, a lever for controlling a heating plant, operating connections between said element and said lever, a heating medium disposed in proximity to said element, means responsive to variations in temperature at a given point for controlling said heating medium, a second thermo-sensitive element co-operating with the first-named element to operate said lever, heat-insulating means disposed between the said elements, and means for directing a part of the heating medium from the heating plant into the zone of said second element.

2. Heat-regulating apparatus comprising a thermo-sensitive element consisting of an expansible and collapsible sheet metal vessel containing a vaporizable substance, a lever for controlling a heating plant, operating connections between said element and said lever, an electric heating coil disposed in proximity to said element, a thermal switch for controlling flow of current through said coil, a second thermo-sensitive element co-operating with the first-named element, heat-insulating means disposed between the said elements and means for deflecting a part of a heating medium from the furnace into the zone of the second-named element.

3. Heat-regulating apparatus comprising a thermo-sensitive element consisting of an expansible and collapsible sheet metal vessel containing a vaporizable substance, a lever for controlling a heating plant, operating connections between said element and said lever, an electric heating coil disposed in proximity to said element, a thermal switch for controlling flow of current through said element, a second thermo-sensitive element co-operating with the first-named element and comprising an expansible and collapsible sheet metal vessel containing a volatile substance, a casing enclosing said elements, a heat-insulating disc disposed between said elements, and means for deflecting a heating medium from said furnace into that portion of the casing surrounding the second-named element.

4. Heat-regulating apparatus comprising a furnace controlling device, an expansible element for actuating said device, electrical means for heating said element and disposed in proximity thereto, an expansible element acted upon by furnace temperatures and co-operating with the first-named element to actuate said device, a thermal seal disposed between said elements, and means for rendering the said electrical means ineffective when either or both of the said elements have expanded or contracted to a predetermined extent.

5. Heat-regulating apparatus comprising a furnace controlling device, an expansible element acted upon by furnace temperatures to actuate said device, a second expansible element for actuating said device, electrical means for heating said second element and disposed in proximity thereto, the said expansible elements being interconnected for cooperative control of said device, and means for rendering the said electrical means ineffective when either or both of said expansible elements has moved to a predetermined extent.

6. Apparatus of the class described comprising in combination a temperature responsive element, a portion of said element being subjected to and responsive to a temperature to be controlled, means for controlling the temperature of another portion of said element and responsive to another temperature to be controlled, and thermal insulating means between said portions.

7. Apparatus of the class described comprising in combination a temperature responsive element, a portion of said element being subjected to a medium the temperature of which is to be controlled, temperature responsive means controlling the temperature of another portion of said element and responsive to another temperature to be controlled, and means thermally insulating said last-named portion of the temperature responsive means from said medium.

8. Apparatus of the class described comprising in combination a temperature responsive element, means for subjecting said element to a temperature to be controlled, and independently acting temperature controlling means acting on said element, said last-named means being thermally insulated from said first-named temperature.

9. Apparatus of the class described comprising in combination a temperature responsive element, a portion of said element being subjected to a medium the temperature of which is to be controlled, and heating means acting on another portion of said element and controlled by means subjected to a second medium whose temperature is to be controlled, said heating means being thermally insulated from said medium.

10. Apparatus of the class described comprising in combination a temperature responsive element, a portion of said element being subjected to a medium the temperature of which is to be controlled, heating means surrounding another portion of said element and actuated by the rise and fall of a second temperature to be controlled, and thermal insulating means surrounding said heating means.

11. Apparatus of the class described, comprising in combination, a temperature responsive element, a portion of said element being subjected to and responsive to a temperature to be controlled, means for controlling the temperature of another portion of the element and responsive to another temperature to be controlled, and means for mounting the said portions of the elements in thermally-insulated relation to one another.

In testimony whereof I, the said ROBERT E. NEWELL, have hereunto set my hand.

ROBERT E. NEWELL.